United States Patent
Miller, Sr.

[19]

[11] Patent Number: 6,089,652
[45] Date of Patent: Jul. 18, 2000

[54] FISH FIGHTING APPARATUS

[76] Inventor: Daniel C. Miller, Sr., 185 Village Cir. Way, Apt. 11, Manchester, N.H. 03105

[21] Appl. No.: 09/126,610

[22] Filed: Jul. 31, 1998

Related U.S. Application Data

[63] Continuation-in-part of application No. 08/659,134, Jun. 4, 1996, abandoned, which is a continuation-in-part of application No. 08/509,980, Aug. 1, 1995, Pat. No. 5,647,161, which is a continuation-in-part of application No. 08/377,425, Mar. 7, 1995, abandoned.

[51] Int. Cl.[7] ............................................. A47C 1/02
[52] U.S. Cl. .................. 297/68; 297/423.2; 297/326; 43/21.2; 9/7
[58] Field of Search ................... 297/326, 217.1, 297/344.21, 344.22, 344.26, 468, 485, 423.25, 423.2, 68; 43/21.2; 114/363

[56] References Cited

U.S. PATENT DOCUMENTS

| | | | |
|---|---|---|---|
| 1,437,848 | 12/1922 | Kisor et al. | 297/326 |
| 3,151,910 | 10/1964 | Larson | 297/423.2 X |
| 3,623,766 | 11/1971 | Funk | 297/188 |
| 3,851,916 | 12/1974 | Quartullo | 297/188 |
| 4,008,500 | 2/1977 | Hall, Jr. | 9/7 |
| 4,086,676 | 5/1978 | Arruza | 9/7 |
| 4,597,356 | 7/1986 | McCaghren et al. | 114/363 |
| 4,722,706 | 2/1988 | Young | 440/7 |
| 5,647,161 | 7/1997 | Miller, Sr. | 43/21.2 |
| 5,816,662 | 10/1998 | Rumburg | 297/485 X |

*Primary Examiner*—Peter M. Cuomo
*Assistant Examiner*—Stephen Vu
*Attorney, Agent, or Firm*—Michael J. Persson; Lawson, Philpot & Persson, P.C.

[57] ABSTRACT

A fish fighting apparatus for assisting an angler in the capture of large hooked fish. The fish fighting apparatus includes a rotational platform that attaches to a fish fighting chair for use by an angler in pulling a hooked fish into a boat using a fishing rod. The platform includes a base having a top surface and a bottom surface and an attachment plate which attaches said platform to the deck of the boat. The base is rotatably connected to the attachment plate via the bottom surface of the base. The base can be rotated substantially independent of the pull on the fishing rod since the position of the point of rotation of the chair attached to the platform is offset from the point of rotation of the base of the platform. An accessory attachment bar is mounted to the attachment plate and a vertical chair support member is pivotally fastened to the accessory attachment bar allowing a slidable seat to pivot back and forth. A pair of uprights are mounted at an opposite end of the accessory attachment bar from the chair support member for releasably attaching a gimbals rod for holding the butt of the fishing rod. In the preferred embodiment, a rod angle-positioning device is also disposed upon the uprights to limit the forward movement of the rod when it is mounted in the gimbals.

18 Claims, 13 Drawing Sheets

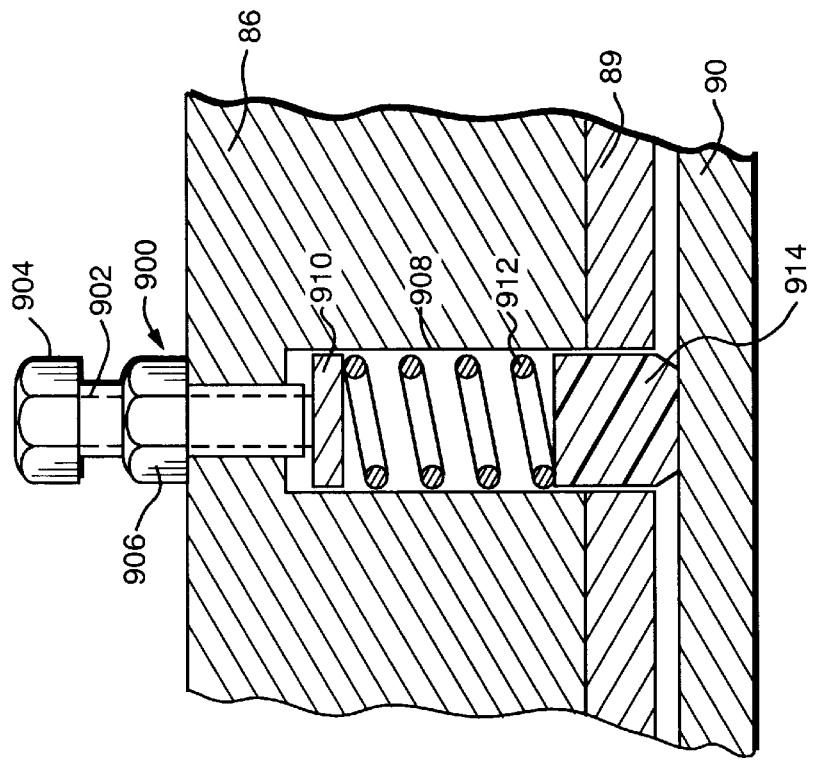
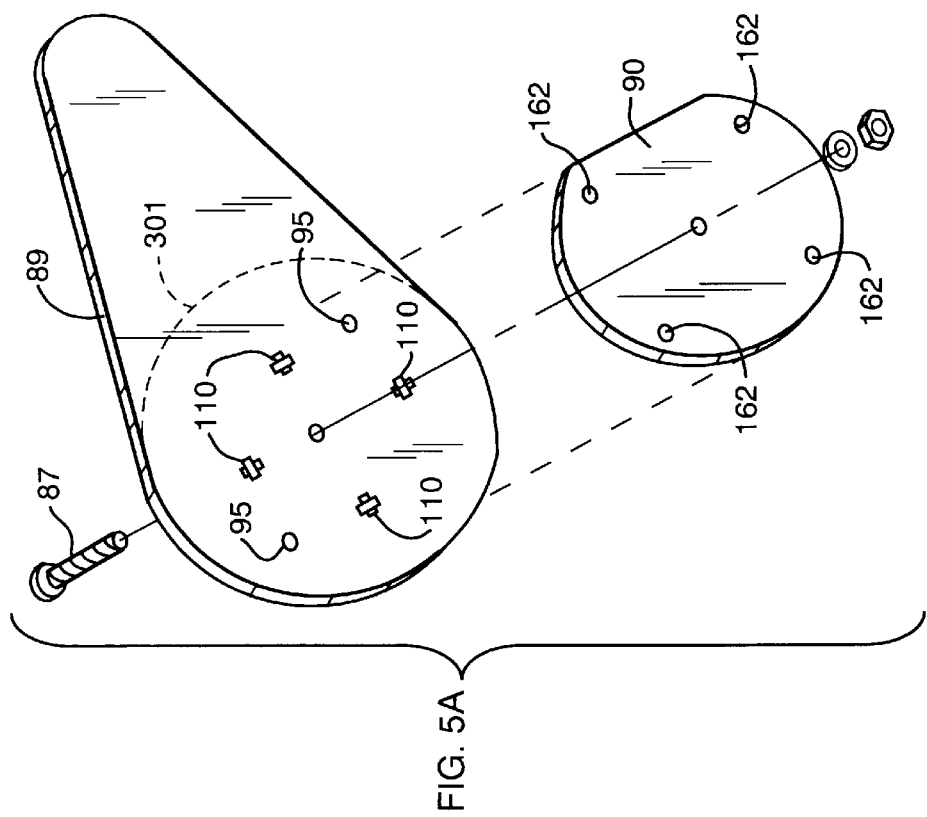
FIG. 5B
FIG. 5A

FISH FIGHTING APPARATUS

RELATED APPLICATIONS

This application is a continuation-in-part of U.S. patent application Ser. No. 08/659/134, filed on Jun. 4, 1996, now abandoned which is a continuation-in-part of U.S. patent application Ser. No. 08/509,980, filed on Aug. 1, 1995, now U.S. Pat. No. 5,647,161, which is a continuation-in-part of U.S. patent application Ser. No. 08/377,425, filed on Mar. 7, 1995, now abandoned.

BACKGROUND OF THE INVENTION

1. Field of the Invention

The invention relates to an apparatus for assisting an angler in the capture of large fish. The invention provides a platform that can be easily converted to a fish fighting chair or a standing fish fighting rail.

2. Description of the Related Art

When fishing for large fish, such as bluefin and bigeye tuna, marlin, swordfish, or shark, anglers typically employ multiple rods that rest in rod holders. When a fish is hooked on a particular rod, the angler removes that rod from the holder and makes his way into a fighting chair to assist in the capture of the fish. These fighting chairs are well known in the art.

Typical fighting chairs provide the angler with a place to sit while reeling in the hooked fish. The fighting chair is considered indispensable in fighting large game fish. Fighting chairs are rated in accordance with the tackle that can be used with them. Most full sized chairs are rated for use with 80 lb. line test. However, it is not uncommon for anglers to use these chairs with 130 lb. tackle or even heavier line tests, as the lightest gauge line is generally considered customary for only small gamefish.

Prior art fighting chairs can be rotated to allow the rod to stay aligned with the unreeled line, thus allowing line to be easily pulled off the reel or wound back onto the reel. The butt of the rod is placed in a rod holder, called a gimbals, which is attached to the fighting chair. The gimbals supports much of the weight of the rod. When fighting particularly large fish, the angler attaches himself to the rod or to the reel via a harness, which allows the angler to use his body weight to pull against the rod and help tire and bring in the fish. There are different types of harnesses currently available, with shoulder, kidney and bucket harnesses being the most common. The bucket harness is recommended for landing the largest fish.

To bring in a large hooked fish, anglers cannot usually simply reel in the fish, as the reel does not possess a long enough cranking arm to enable the angler to overcome the strength and weight of the fish and thereby pull the fish to the boat. Nor is the line that is used strong enough to hold the fish if the animal decides to make a sudden dart away from the direction of the pole. Instead, anglers use a combination of several motions. First, the angler pulls the rod toward his body so that it pivots about the butt of the rod, and so that the tip of the rod moves from a near horizontal position to a near vertical position. This movement pulls the fish toward the boat. Then, the angler reverses the motion by quickly lowering the tip of the rod until it is in the near horizontal position. Lowering the tip of the rod creates slack in the line, which the angler reels in as the rod is being lowered. Repetition of this process gradually brings the fish to the boat. The reel that holds the line is fitted with a friction drag that is set in accordance with the strength of the line. Any pull on the line greater than the set amount, for example, when a fish tries to break free, causes the reel to pay out line as long as the pulling force is greater than the set drag force. For a human being to pull against this heavy weight for an extended period of time is extremely fatiguing.

To assist in the pulling portion of the process, fighting chairs are also known to incorporate attached footrests, which the angler pushes against with the feet while using the arms, shoulders, and body weight to pull the rod toward the near vertical position and thus pull the fish toward the boat. The position of the footrests is typically adjustable to accommodate the leg length of the angler. When landing an extremely large fish using a bucket harness, the angler raises from the seat with the bucket harness attached and allows the weight of his body to pull the fish up as the angler drops back into the chair, gaining a little line with each repetition.

One of the problems with the prior art fighting chairs is that they rely primarily upon the muscles of the upper body and back to pull the fish toward the boat. Or, as mentioned with a bucket harness, leg power alone is used. Most anglers become extremely fatigued in the process of bringing in a large fish, and sometimes lose the fish because the angler does not have enough strength and energy to properly respond to the movements of the fish. Furthermore, many potential anglers, including many women, children, disabled individuals and the elderly, are deterred from attempting to bring in large game fish, because of the extreme physical strength and endurance required to do so when using the prior art fighting chairs.

Another problem with the prior art fighting chairs is that they do not easily and instantly rotate to keep the rod parallel with the line. With prior art fighting chairs, the weight of the fish upon the line produces a downward force upon the tip of the rod. This downward force is transferred to the butt of the rod, to the gimbals, and to the front of the fighting chair where the gimbals is attached. The downward force upon the front of the fighting chair creates a downward force upon the front of the chair's horizontal swivel joint, which creates an equal, upward force upon the back of the chair's swivel joint. Thus, the chair tends to bind in whatever position it is in, and the swivel only can operate with great rotational force applied. When a fish moves so that the line is no longer parallel with the rod, it is desirable for the chair to rotate instantly so as to keep the line from rubbing against the eye at the end of the rod. Also, any sideways pull can cause the hook to be dislodged from the fish's mouth. However, for a prior art fighting chair to rotate into the desired position, a crew member must push down upon the back of the chair while rotating the chair (the angler cannot usually rotate the chair because his feet are resting upon the footrest). Every time the fish changes position relative to the bow-stern axis of the boat, the chair must be manually rotated in this fashion.

Another problem with the prior art fighting chairs is the gimbals structure makes it difficult to insert the rod. The opening of the gimbals is only slightly larger than the diameter of the butt of the rod. However, with a fish on the line, the rod is very difficult to maneuver. Thus, the gimbals used on prior art fighting chairs do not provide a means for easily guiding the butt of the rod into the gimbals. Further, the gimbals have limited adjustment so that anglers having, for example, short arms and a long torso, would find themselves reaching to the rod in an uncomfortable manner.

Another problem with the prior art fighting chairs is that they do not provide a means for preventing the torso harness from squeezing into the sides of the angler. In present systems, the torso harness must attach to the reel, which is much narrower than the shoulder width of the angler. The torso harness, functionally equivalent to a rope with a wide flat portion located midway between the two ends, is wrapped around the body of the angler and attached to the rod or reel, with the harness being widest where it touches the angler's body. Because the attachment points of the two ends of the harness to the rod or reel are co-incident or separated by only a few inches, the harness tends to squeeze the body of the angler. This squeezing can become quite uncomfortable during the time it takes the angler to bring in the fish, yet the harness becomes more important as the angler's upper body strength fades and he is forced to rely more and more upon body weight to pull the fish towards the boat.

Another problem with the prior art fighting chairs is that they do not provide a means of preventing angler injury when a line with a fish attached breaks. When an angler is pulling upon the rod, his body is only stabilized by the force of the fish upon the line. If the line breaks while the angler is pulling, the angler can be suddenly thrown off balance and may fall violently into the chair or onto the deck of the boat, sustaining a potentially severe injury. It is recommended that an angler always keep the left hand (assuming the person is right-handed) on the reel at all times to prevent the rod from hitting the angler in the face should the line break unexpectedly.

Another problem with the prior art fighting chairs is that they require the angler to slide back and forth upon the seat of the chair while bringing the fish to the boat. This sliding action is far from frictionless, and adds to the fatiguing nature of the process of bringing in the fish. In addition, because of this sliding action, an angler cannot comfortably wear shorts while bringing in a fish if the angler is to avoid painful blisters on the legs.

Since the angler is responsible for setting the trolling angle of the rod, it cannot be set independently of the angler. The ideal trolling angle may be inconsistent with the angler's length of arms or upper body strength.

While the typical fish fighting chair, such as shown in FIG. 1, is capable of being adjusted to some degree, the range of adjustment is rather limited and does not include adjustment of the seat position relative to the gimbals rod holder nor the height and angle of the foot rest relative to the chair nor height of the gimbals rod holder relative to the chair height.

Safety with existing chairs is also a potential problem, in that the rod is "anchored" to the angler via the harness. If the reel locks up (i.e., the drag ceases to function) or the angler's foot slips off the footrest, the angler can be pulled overboard. At least one death has resulted from such accidents.

Further, while a mechanical advantage would be useful for recreational and commercial fishing, it is prohibited for tournament fishing. The typical fish fighting chair is thus set up for tournament fishing only. Some anglers participating in tournament fishing prefer to stand, yet the typical fish fighting chair cannot be converted to a standard rig. Also, this type of chair is not easily removable so this valuable deck space must be dedicated solely to the fish fighting chair.

A fish fighting apparatus having the flexibility for use in recreational, commercial, and tournament settings, or that can be easily adapted for a non-fishing use and solves the above described problems is not found in the prior art.

SUMMARY OF THE INVENTION

It is an aspect of the invention to provide a fish fighting apparatus that utilizes a rotational platform that serves to releasably mount the fish fighting chair.

It is still another aspect of the invention to provide a fish fighting platform that can easily adjust the position of the gimbals rod holder to meet an angler's individual preferences.

Another aspect of the invention is to provide a fish fighting apparatus that has an adjustable pedal-to-seat distance and an adjustable pedal height relative to the seat height.

It is still another aspect of the invention to provide a fish fighting apparatus which easily and instantly rotates to keep the rod parallel to the line.

It is still another aspect of the invention to provide a fish fighting apparatus that can be used with or without a torso harness.

It is still another aspect of the invention to provide a fish fighting apparatus that prevents angler injury caused by the fishing line breaking while the angler is pulling the fish towards the boat.

Still another aspect of the invention is to provide a fish fighting apparatus that includes a seat that is adjustable as to height above the deck as well as forward and rearward positioning.

It is an aspect of the invention to provide a fish fighting apparatus that enables an angler to use his/her back muscles and legs to pull the fish towards the boat.

Finally, it is an aspect of the invention to provide a fish fighting apparatus that has a plurality of configurations, with each configuration having a plurality of adjustments so that any angler regardless of size and personal preference can be comfortable when using the apparatus to land a fish.

The invention is a fish fighting apparatus having a rotational platform that attaches to a fish fighting chair for use by an angler in pulling a hooked fish into a boat using a fishing rod. The platform includes a base having a top surface and a bottom surface and an attachment plate which attaches said platform to the deck of the boat. The base is rotatably connected to the attachment plate via the bottom surface of the base. The base can be rotated substantially independent of the pull on the fishing rod since the position of the point of rotation of the chair attached to the platform is offset from the point of rotation of the base of the platform. An accessory attachment bar is mounted to the attachment plate and a vertical chair support member is pivotally fastened to the accessory attachment bar allowing a slidable seat to pivot back and forth. A pair of uprights are mounted at an opposite end of the accessory attachment bar from the chair support member for releasably attaching a gimbals rod for holding the butt of the fishing rod. In the preferred embodiment, a rod angle-positioning device is also disposed upon the uprights to limit the forward movement of the rod when it is mounted in the gimbals.

BRIEF DESCRIPTION OF THE DRAWINGS

FIG. 5a is a detailed bottom view of one embodiment of the rotatable deck mounting assembly of the chair of FIG. 2.

FIG. 5b is a detailed cross-sectional view of one embodiment of the swivel tension adjustment assembly.

DETAILED DESCRIPTION OF THE INVENTION

The present invention is similar in many respects to that of the inventor's related U.S. Pat. No. 5,647,161. However, the present invention does not utilize a lever system to provide a mechanical advantage to the user and includes a number of improvements to the chair assembly, gimbals assembly, butt-rest assembly and harness assembly.

Figure 1:
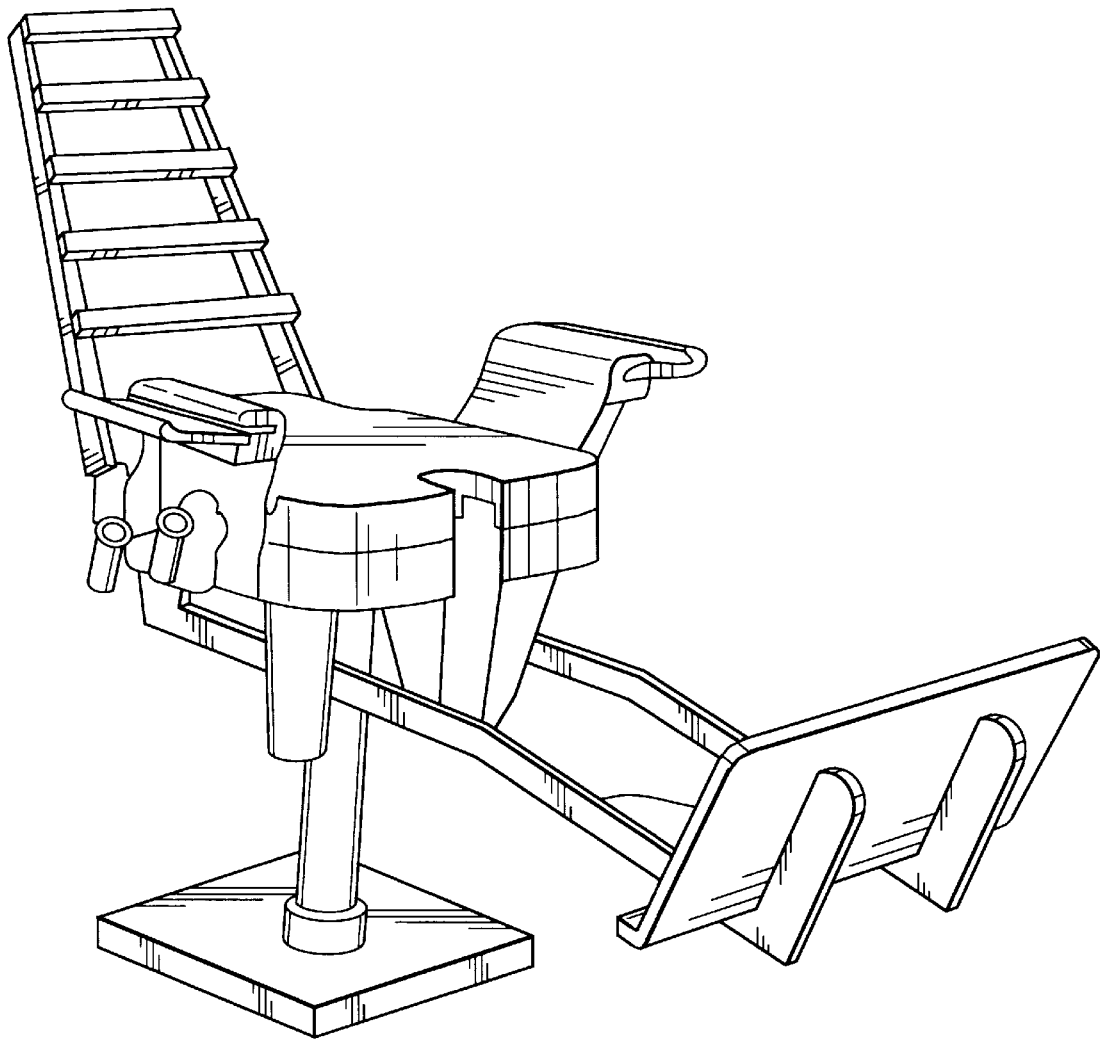
FIG. 1 is a typical prior art fish fighting chair.
Figure 2B:
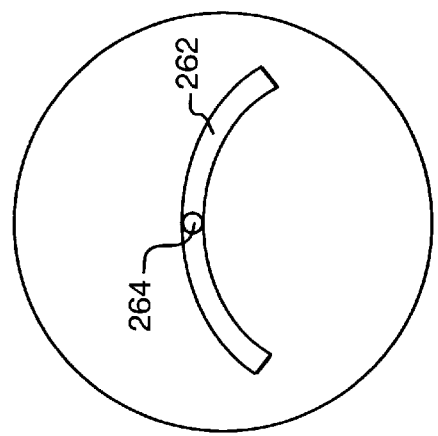
FIG. 2 is a detailed side view of one embodiment of the fish fighting chair of the present invention.
Figure 2A:
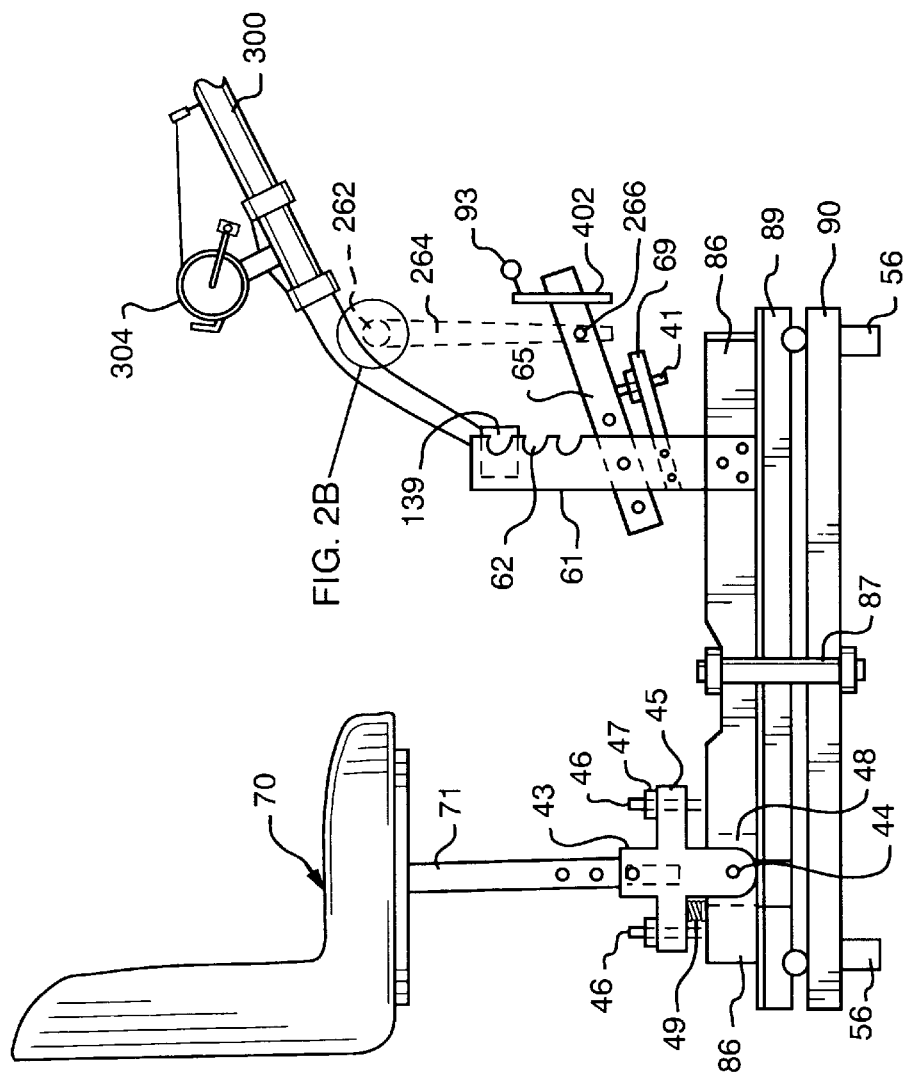

FIG. 2 is a detailed side view of one embodiment of the fish fighting chair assembly of the present invention that may be used either for tournament or for recreational/commercial fishing. In its most basic form, the fish fighting chair assembly of the present invention includes a chair 70 pivotally attached to an accessory attachment bar 86, a deck mounting assembly that rotatably attaches the accessory attachment bar 86 to the deck of a boat, and a fish fighting assembly rigidly attached to the other end of accessory attachment bar 86 and including a gimbals 139 and a pair of foot pedals 93. In operation, the angler will sit on seat 70, insert a rod 300 into gimbals 139, and position his feet on the foot pedals 93. One a fish is hooked, the angler will maintain rod 300 in gimbals 139, will grip the rod 300, and will exert a backward force against the rod 300 by pushing against foot pedals 93 with his feet and against seat 70 with his back, causing the chair to pivot backward and moving the rod 300 through the same backward arc as chair 70. By allowing the chair 70 to pivot backward, the angler has the advantage of being able to use his back muscles to his advantage and to avoid the strain on lower back muscles caused by the leaning forward and pushing back motions of conventional fish fighting chairs.

Figure 3:
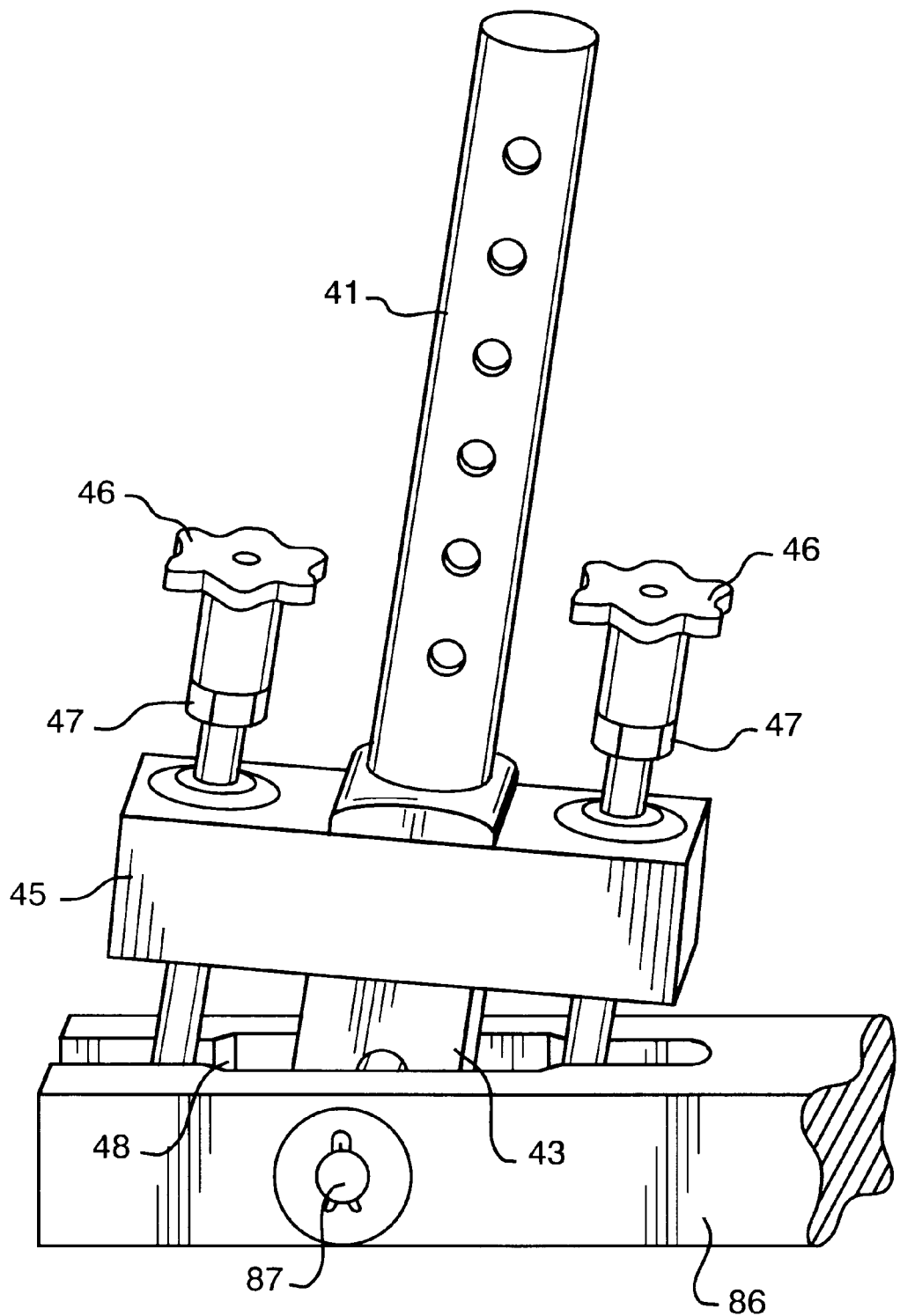
FIG. 3 is a side isometric view of the preferred embodiment of the pivot assembly of the fish fighting chair of the present invention.

Referring now to FIGS. 2 & 3, the pivot feature of the chair 70 of the present invention allows the angle of chair 70 to be changed relative to the fish fighting attachment that holds the rod and reel. In order for the chair 70 to pivot, accessory attachment bar 86 must extend or a separate bar 86 be provided at the point where chair 70 is to be attached. A recess 48 is provided in accessory attachment bar 86 which will accommodate the pivotal end of pivoting stanchion bar 43. Stanchion bar 43 is pinned via pivoting pin 87 so that chair 70 is free to "pivot" forth and aft but not from side to side. Chair adjustment bar 45 is rigidly fixed to stanchion bar 43 near the pivoting end of bar 43. Fore and aft adjustment positions are provided by chair tilt adjustment screws 46 which are threaded into adjustment bar 45. Chair tilt adjust-ment screws 46 limit the range of fore and aft motion of chair 70 by merely lengthening or shortening, respectively, screws 46 and then locking them into position via lock nuts 47. If a fixed position is desired, then screws 46 are set so that both adjustment screws 46 firmly engage accessory attachment bar 86 when chair 70 has been set at the desired angle. If a range of "pivoting" motion is desired, screws 46 are set so that only one screw engages accessory attachment bar 86 when the full forward or aft position is obtained. A nylon or other suitable material washer or other methods well known in the art could be used with pin 44 to increase the pivotal resistance so that chair 70 would not "pivot" by itself when the boat is moving within a seaway unless the chair was deliberately being "pivoted" by an angler. Instead of adding pivotal resistance via pin 44, the embodiment of FIG. 2 utilizes a spring 49 to bias chair 70 in a forward position until an angler "pivots" the chair. Rigid attachment between the pivot assembly and the seat may be accomplished by forming the stanchion bar 43 with a hollow portion for receiving a chair post 71, as shown in FIG. 2, or by forming a hollow chair post 71 for receiving a solid portion 41 extending from the stanchion bar 43, as shown in FIG. 3.

Figure 4:
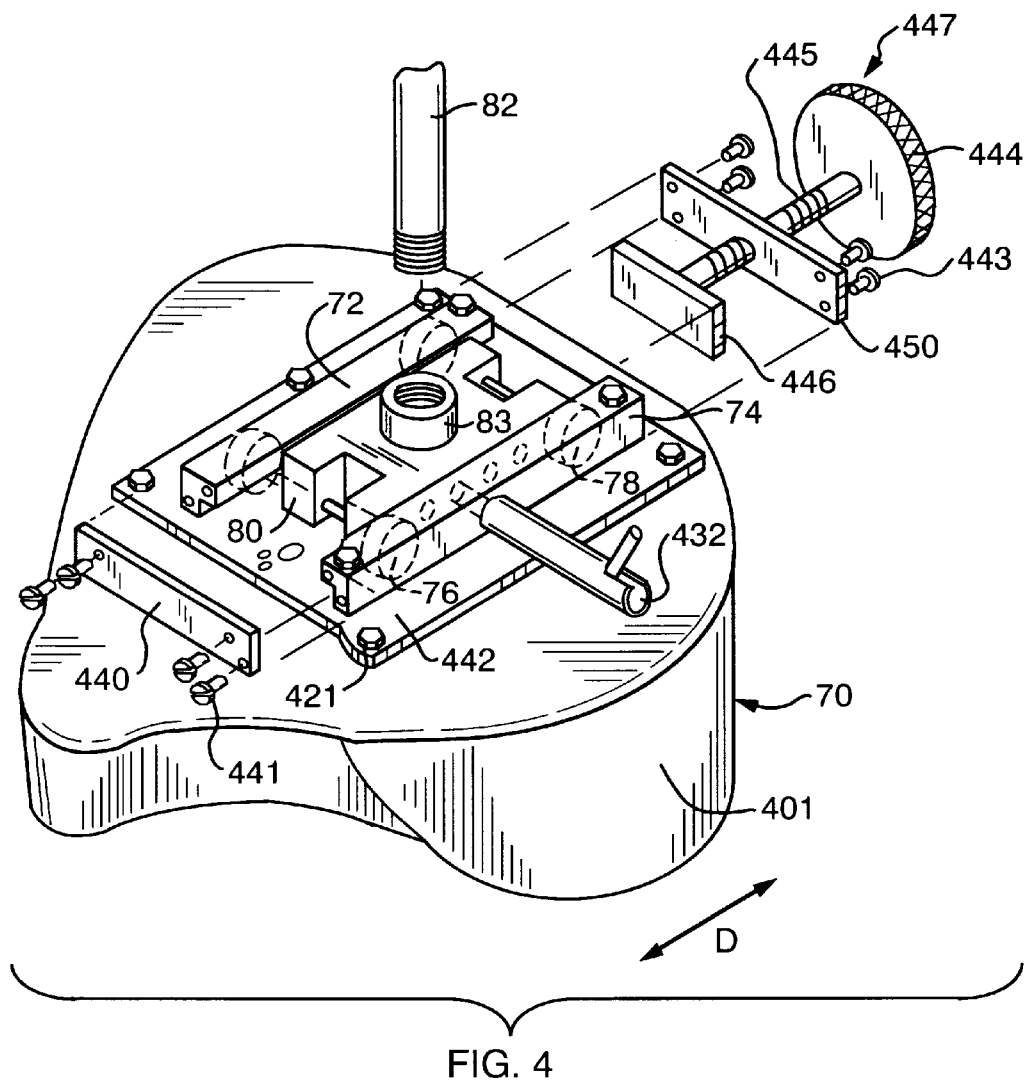
FIG. 4 is a detailed bottom view of the sliding chair assembly of the chair of FIG. 2

Referring now to FIG. 4, a detailed bottom view of a seat of the chair 70 of FIG. 2 is shown. Seat 401 is constructed of materials well known in the art and preferably has a "motorcycle" shape to permit the unrestricted use of the angler's legs. Plate 442 is attached by screws 421 to seat 401. Attached to plate 442 is left seat rail 72 and right seat rail 74. Left seat rail 72 and right seat rail 74 slideably contain front seat roller 76 and rear seat roller 78. Material selection is not critical but must be suitable for a marine environment. Front seat roller 76 and rear seat roller 78 are rotatably attached to center seat rail carriage 80. Center seat rail carriage 80 is attached to seat stanchion 82 via threaded collar 83. In this manner, seat 401 can be adjusted fore and aft along direction D such that anglers with varying leg lengths can be easily accommodated. Once seat 401 is placed at the proper distance from the rod 300, it can be locked into position using spring locking pin 432 so that an angler can be supported against the back of seat 401 when the angler's legs are pushing on pedals 402. Also, seat 401 could be fitted with straps (not shown) so that the angler can be held firmly within seat 401 when fighting a fish. In this manner, the full strength of the angler's arms and legs can be applied against rod.

If the angler prefers, seat 401 may be left free to slide so that the angler can use a combination of the angler's body weight and the partial strength of the angler's arms and legs to pull in the fish. Plate 440 is attached to left and right rails 72 and 74 via screws 441 to prevent seat 401 from leaving the track in the forward position. The permissible travel of seat 401 can be adjusted using assembly 447. Assembly 447 consists of plate 446 that serves as stop against carriage 80. Plate 446 is attached to wheel 444 via axle 445. Plate 450 bolts assembly 447 to left and right rails 72, 74 via screws 443. By merely turning wheel 444, threaded axle 445 moves plate 446 closer or further away from the rear of mounting plate 442 to adjust the maximum sliding movement of seat 401.

FIGS. 5a and 5b show exploded bottom views of one embodiment of the deck mounting assembly. As shown in FIG. 5a, deck plate 90 is attached to the deck of the boat through holes 162. Deck plate 90 is bolted to swivel plate 89 via pin 87. In order to be able to reach holes 162 when deck plate 90 is bolted to the deck, access holes 95 are provided in swivel plate 89. The top surface of swivel plate 89 is preferably covered with a non-slip material suitable for a marine environment. So that swivel plate 89 can be easily rotated relative to deck plate 90, either deck plate 90 or swivel plate is fitted with bearings 110. Bearings 110 can be any type that is suitable for use in a marine environment. Swivel plate 89 and deck plate 90 can also be fitted with stops so that swivel plate 89 cannot be rotated beyond the desired position on either side of the directly aft position. While swivel plate 89 is shown having a tear-drop shape, this is not required. As shown an FIG. 2, a plurality of spacers 56 may also be provided under deck plate 90 to permit pin 87 to freely rotate without rubbing against the deck of the boat.

When the chair 70 is not being used, the motion of the sea may cause the chair 70 to swivel violently since the force to cause chair 70 to rotate is small due to bearings 110. Therefore, as shown in FIG. 5b, the deck mounting assembly may be fitted with a swivel tension adjustment assembly 900 that can adjust the rotational friction. Accessory attachment bar 86 and swivel plate 89 are fitted with opening 908 that houses assembly 900. Bolt 902 is attached to compression plate 910 and held in place by locking nuts 904 and 906. Once nuts 904 and 906 are tightened against one another, the position of bolt 902 will be securely fixed. Compression plate 910 compresses spring 912 which urges friction pad 914 against deck plate 90. If the angler desires to lock swivel plate rigidly in position, for example, in the situation where the boat is in a severe storm, nut 906 would be merely tightened further, then locked using nut 904. A variety of methods would be equally suitable to adjust the force necessary to rotate swivel plate 89. For example, rather than nuts 904 and 906, a knurled wheel arrangement could be provided that would permit adjustment by merely turning the wheel.

Figure 6:
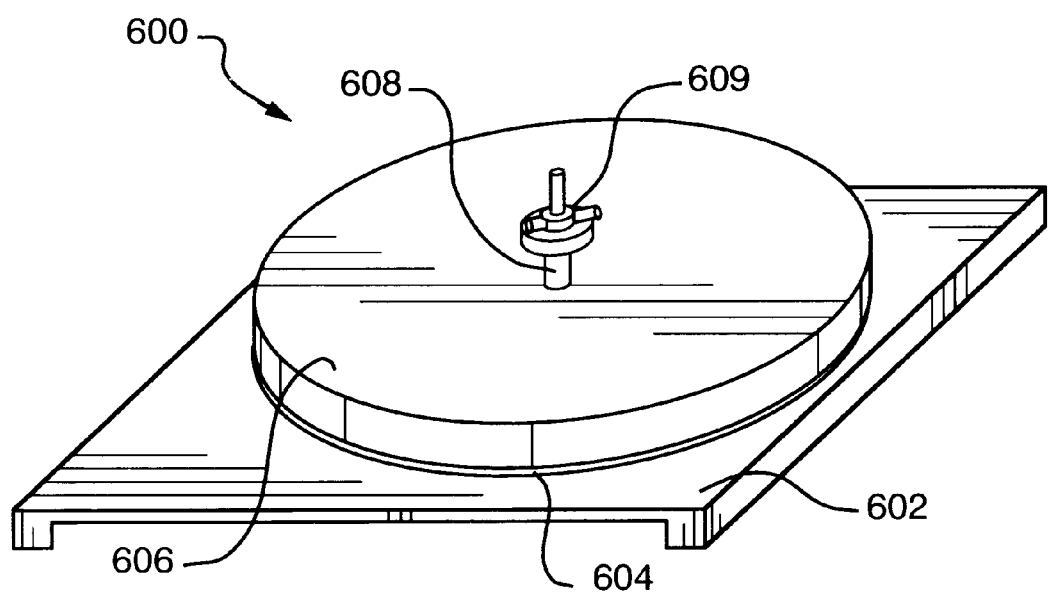
FIG. 6 is an isometric view of the preferred deck mounting assembly of the present invention.

Referring now to FIG. 6, the preferred embodiment of the deck mounting assembly is shown. As shown in FIG. 6, the preferred embodiment of the deck mounting assembly 600 includes a substantially rectangular deck plate 602, a round and flat Teflon bearing 604 mounted on top of deck plate 602, a swivel plate 606 mounted on top of flat Teflon bearing 604 and including openings for attaching the accessory attachment bar (not shown), and a swivel tension adjustment assembly 608 for adjusting the tension on the deck mounting assembly. Swivel tension adjustment assembly 608 passes through a series of holes through the deck plate 602, Teflon bearing 604, swivel plate 606 and accessory attachment bar (not shown) and is adapted to increase or decrease the force required to cause rotation of the assembly, and to provide a means for locking the chair in place. In the preferred embodiment, swivel tension adjustment assembly 600 includes a first pin (not shown) that attaches to a groove (not shown) in the bottom of the deck plate 602 to prevent rotation of the swivel plate 606, and a top portion 609 that sandwiches the assembly together. Top portion 609 of swivel tension adjustment assembly 608 includes tension adjustment means, such as a screw and bolt arrangement, to provide compressive force to the assembly for adjusting the force required to cause rotation of the assembly. It should also be noted, however, that in other embodiments the Teflon bearing 604 may be eliminated and the bearing surfaces of deck plate 602 and swivel plate 606 are coated or mounted with Teflon, or other low friction material, to achieve similar results.

Figure 7:
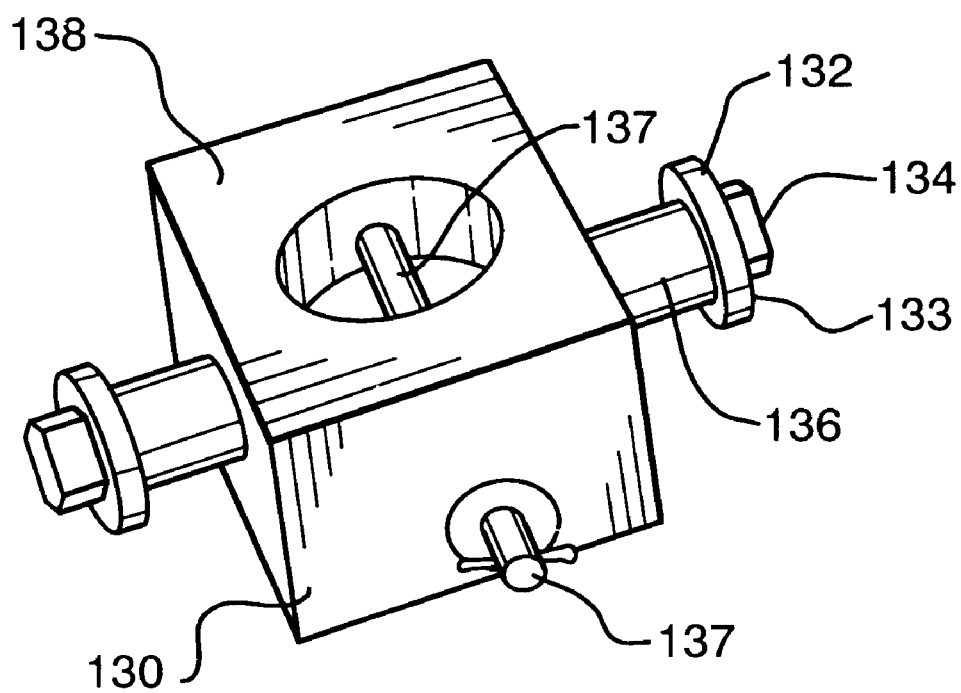
FIG. 7 is detailed isometric view of the gimbals holder of the embodiment of FIG. 2

FIG. 7 is a detailed isometric view of the gimbals holder 139 shown in FIG. 2. Gimbals block 130 is preferably fabricated from a single piece of material such as aluminum. However, it could also be cast in plastic such as DELRIN. Opening 138 is flared to ease the butt of the rod into holder 139. The fishing rod is inserted until the notched butt end of the rod engages pin 137. Pin 137 is held in place by a cotter pin or any other suitable locking mechanism well known in the art. Holder 139 is free to rotate on rollers 136 that engage a matched pair of openings 62. A flat 133 is machined or cast on end caps 132. Caps 132 are held in place via bolts 134. Once holder 139 is positioned within openings 62, flat 133 is rotated to face forward and then holder 139 is locked into place using gimbals retainer member 63.

Figure 8A:
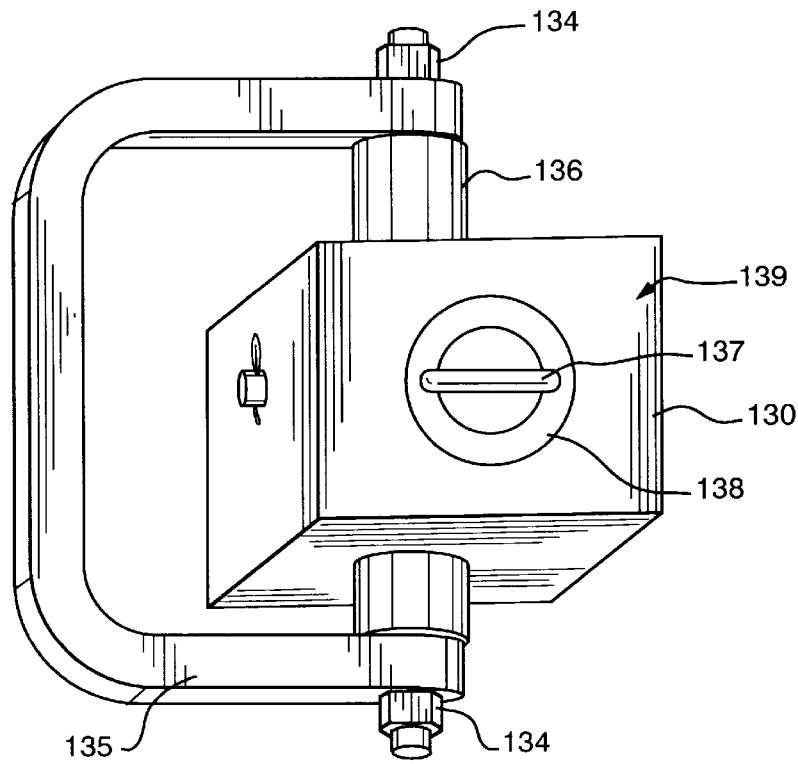
FIG. 8 is a view of an alternative embodiment of gimbals holder and gimbals assembly.
Figure 8B:
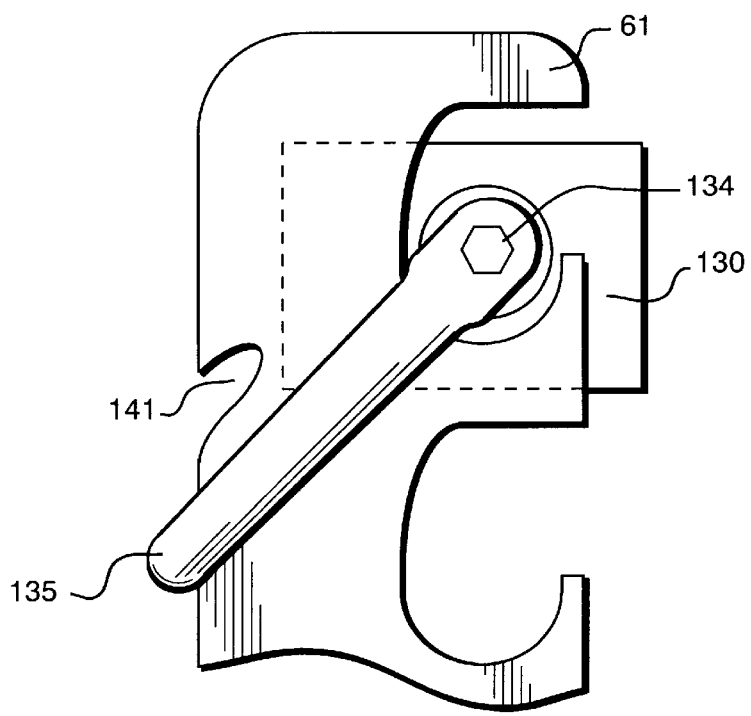

FIG. 8 is a view of alternative embodiment of gimbals holder 139 and gimbals assembly 66. In this embodiment, the primary difference relates to the method that holder 139 is held within gimbals assembly 66. As before, a plurality of openings 62 are provided in gimbals support bars 61. However, rather than using a pair of gimbals retaining members 63, holder 139 is locked into place via U-member 135. To lock holder 139 into place, holder 139 is slid over gimbals support bars 61 so that U-member 135 is located in the rear. Once a pair of openings 62 is selected, each roller 136 is placed in with its respective opening 62. U-member 135 is pushed down as shown to lock holder 139 in position. Openings 141 prevent holder 139 from dislodging if bumped or jarred due to the motion of the boat or from the fishing rod undergoing a sudden jerk. To remove, U-member 135 is pulled up so that it is essentially perpendicular to gimbals support bars 61, and then slid free either to a new set of matched openings or removed from gimbals support bars 61.

Figure 9:
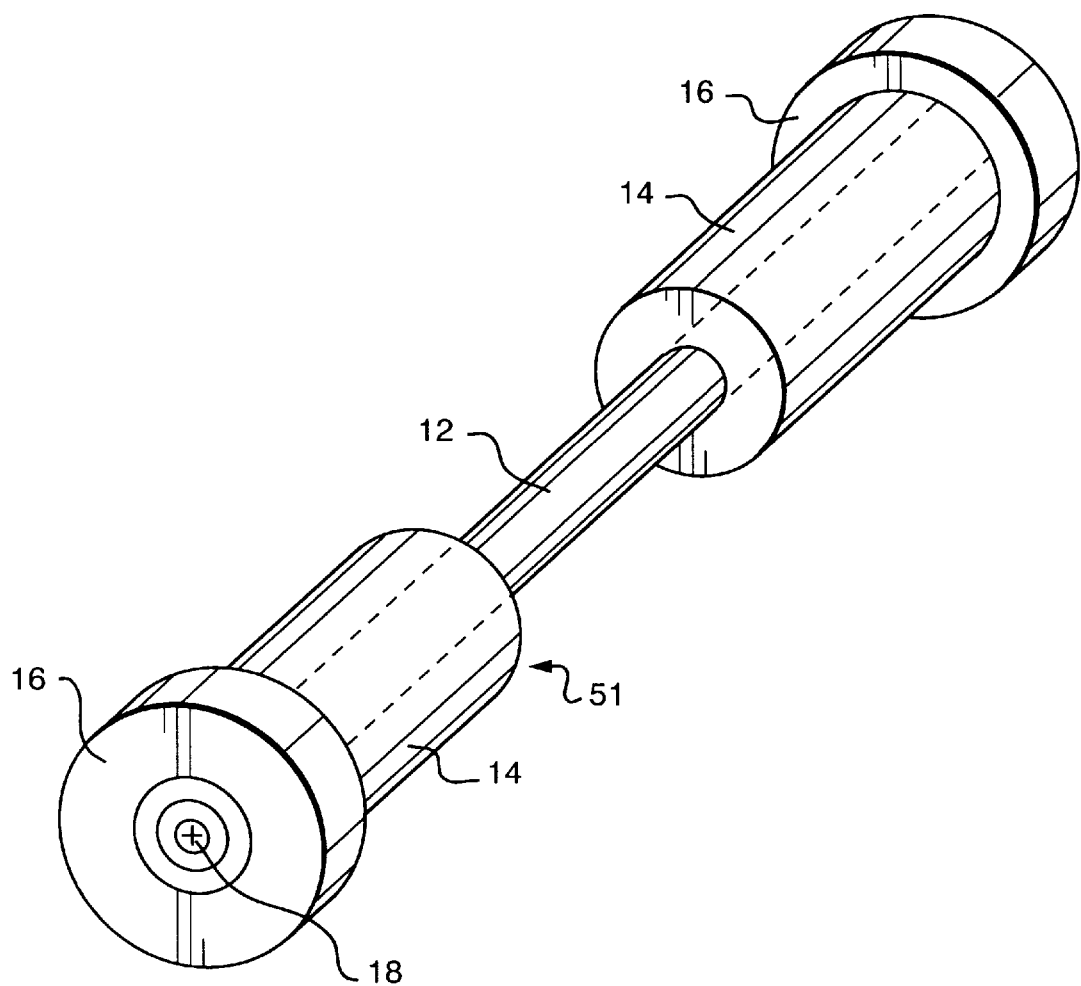
FIG. 9 is a detailed isometric view of stand up fish fighting attachment for use with the embodiment of FIG. 2.

FIG. 9 is a detailed isometric view of stand up fish fighting attachment. Stand-up assembly 51 is mounted onto gimbals support bars 61 by being placed in a matching pair of gimbals support openings 62 and then locked into place via gimbals retainer member 63 using shoulder screws 64. Stand-up assembly 51 is locked into gimbals support openings via bar 12. Sleeves 14 are fitted onto bar 12 and provide padding for the angler who would brace his/her legs against bar 12. As before, the height of bar 12 is adjustable via the plurality of pair openings 68. Sleeves 14 are kept on bar 12 via end caps 16 which, in turn, are held via bolts and washers 18. Sleeves 14 are preferably of foam or plastic that provide a comfortable cushion yet able to withstand the rigors of a marine environment. In the stand-up fishing embodiment, the optional butt rest 262 for rod 300, shown in FIG. 2 in the dotted line and the detailed partial top view within the circle, may also be utilized. Butt rest 262 prevents rod 300 from being pulled down too far. In this embodiment butt rest 262 is preferably a round bar about 1¼ inches in diameter having an arc-shape as shown. Butt rest 262 is held in position by vertical support 264, preferably a similar piece of bar which is bolted via 266 to pedal support 65. If butt rest 262 is used, gimbals holder 139 would be moved to a lower position so that the stand up fish fighting attachment could be inserted in the top most opening 62 in gimbals support bar 61. The height of butt rest 262 should be positioned at the normal trolling angle which ranges from 20 to 45 degrees.

Figure 10:
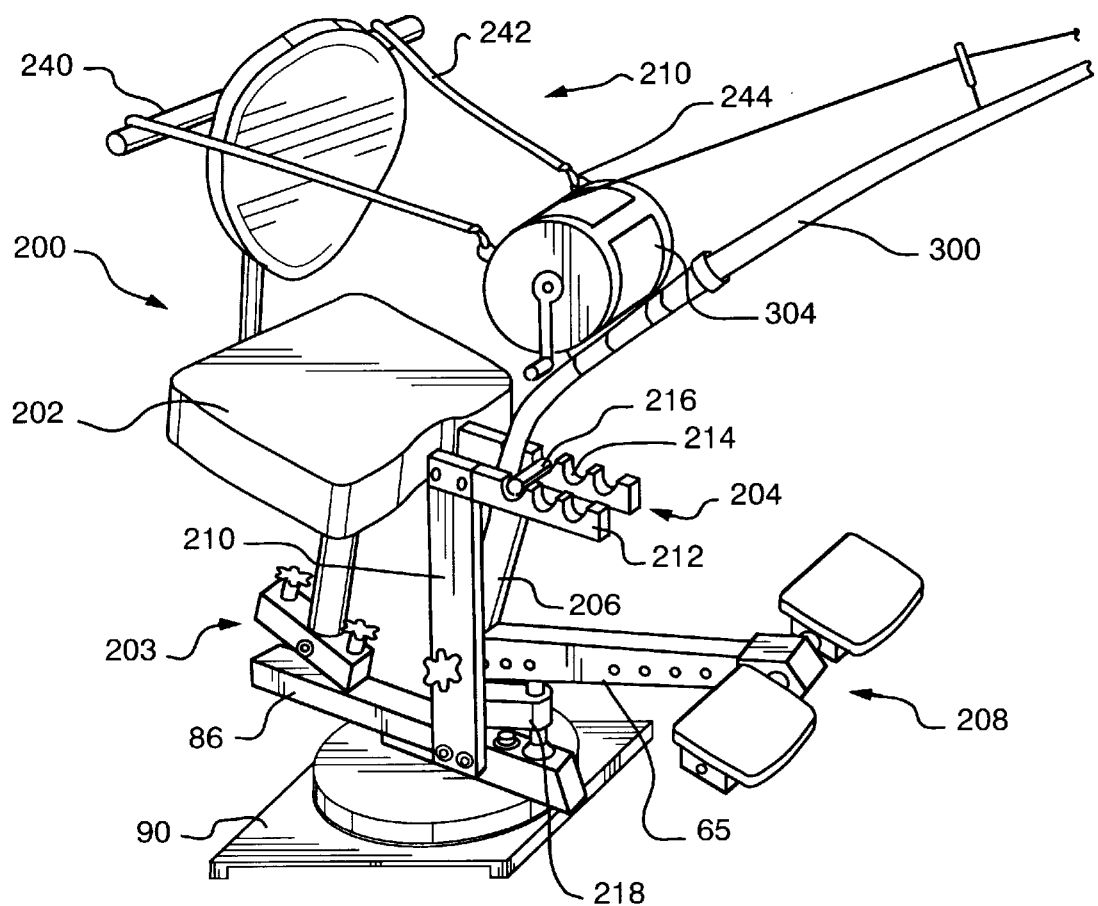
FIG. 10 is a detailed isometric view of the preferred fish fighting chair of the present invention showing a fishing rod mounted in the preferred gimbals and an improved harness system holding the rod in place.

Referring now to FIG. 10, the preferred fish fighting chair assembly 200 of the present invention is shown. Preferred fish fighting chair assembly 200 is similar to the embodiment of FIG. 2 in that the chair 202 is attached to an accessory attachment bar 86 via a pivot assembly 203 that allows the chair to pivot back and forth and rotate about the deck plate 90, and in that it includes adjustable footrests. However, the preferred fish fighting chair 200 includes a number of differences from the embodiment of FIG. 2, including an improved butt-rest 204, gimbals assembly 206, pedal assembly 208, and harness assembly 210.

Figure 11:
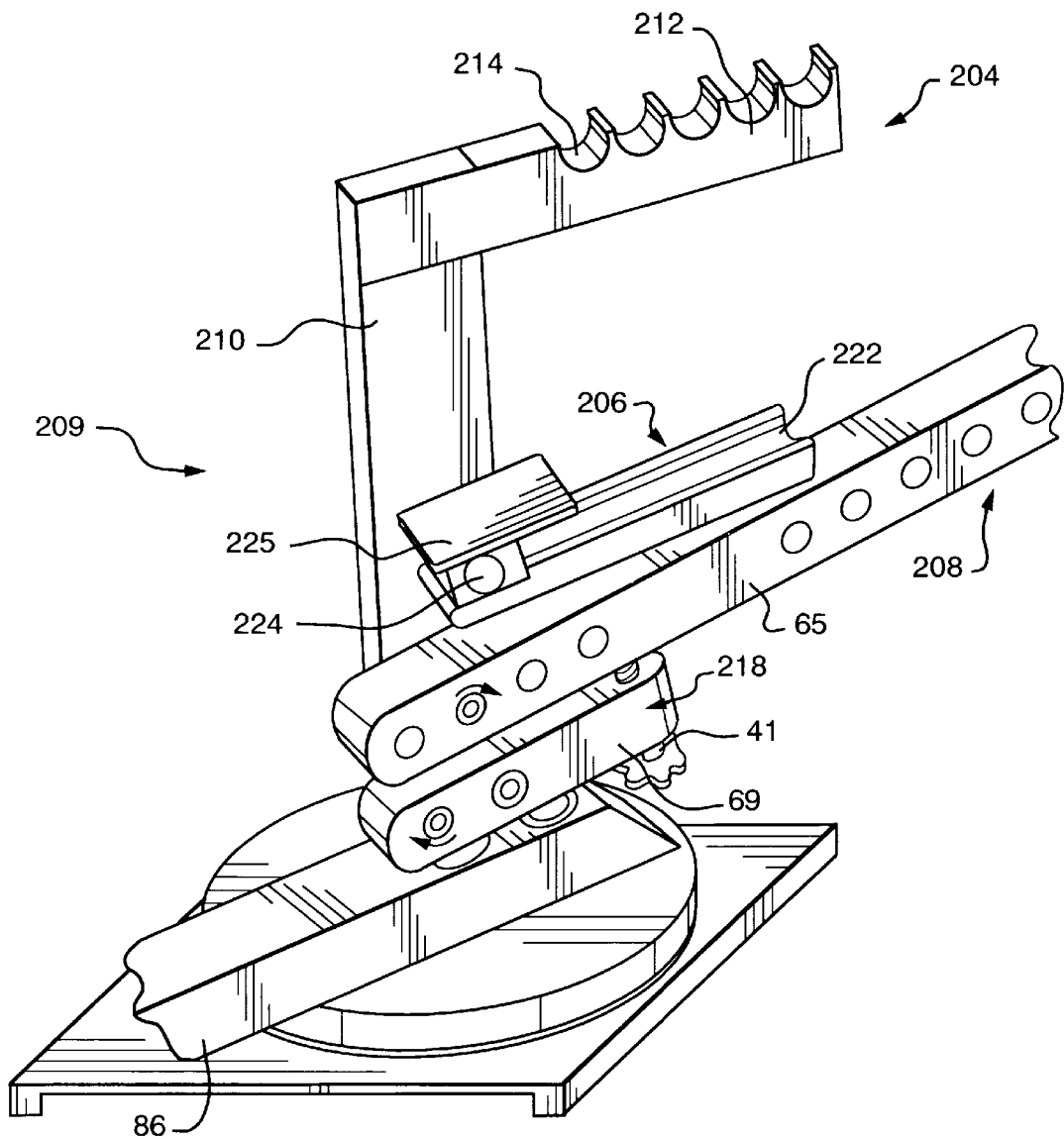
FIG. 11 is a cut away side isometric view of the fish fighting assembly of the preferred embodiment showing the improved gimbals and butt-rest assemblies.

As shown in FIGS. 10 & 11, the improved butt-rest assembly 204 and gimbals assembly 206 of the preferred embodiment are integrated with the pedal assembly 208 into the preferred fish fighting assembly 209. Improved butt-rest assembly 204 includes a pair of uprights 210 rigidly attached to the accessory attachment bar 86 and having a pair of toothed members 212 extending perpendicular to the uprights 210. Toothed members 212 include a plurality of grooves 214 dimensioned to retain a pin 216 in a fixed position to serve as a butt-rest for the rod 300. By moving the pin 216 back and forth between the grooves 214, a desired angle for rod 300 may be obtained.

Pedal assembly 208 is attached between the uprights 210 and includes a pedal support 65 rotatably attached to uprights 210 and a foot pedal adjustment mechanism 218 rigidly attached between uprights 210. Foot pedal adjustment mechanism 218 includes a bar 69 the extends at a predetermined angle from the uprights in the direction of pedal support 65, and a jacking screw 41 that extends through the bar 69 and is dimensioned to contact pedal support 65 such that pedal support 65 may be raised or lowered to a desired position. As further described with reference to FIG. 12, foot pedals 220 are attached to the end of pedal support 65 and are coated with a non-slip surface.

Gimbals assembly 206 is rotatably attached to the uprights 210 at a position adjacent pedal support 65 such that the range of rotation of the gimbals is limited. In this embodiment, gimbals assembly includes an elongated member 222 that contacts pedal support 65, a pin 224 for rotatable attachment between uprights 210, and a second member 225 disposed parallel to elongated member 222. The elongated member 222 and the second member 225 include profiled inner surfaces that form a pocket that is dimensioned to accept the butt end of the rod. The preferred gimbals assembly 206 is advantageous over current gimbals designs because the contact between the elongated member 222 and the pedal support 65 prevents the gimbals assembly 206 from rotating to an upside down position. Thus, if the end of the rod is inadvertently removed from the gimbals while fighting a fish, it may be easily reinserted into the gimbals assembly 206 without the need for a second person to manipulate the gimbals assembly 206 into the correct position.

Figure 12:
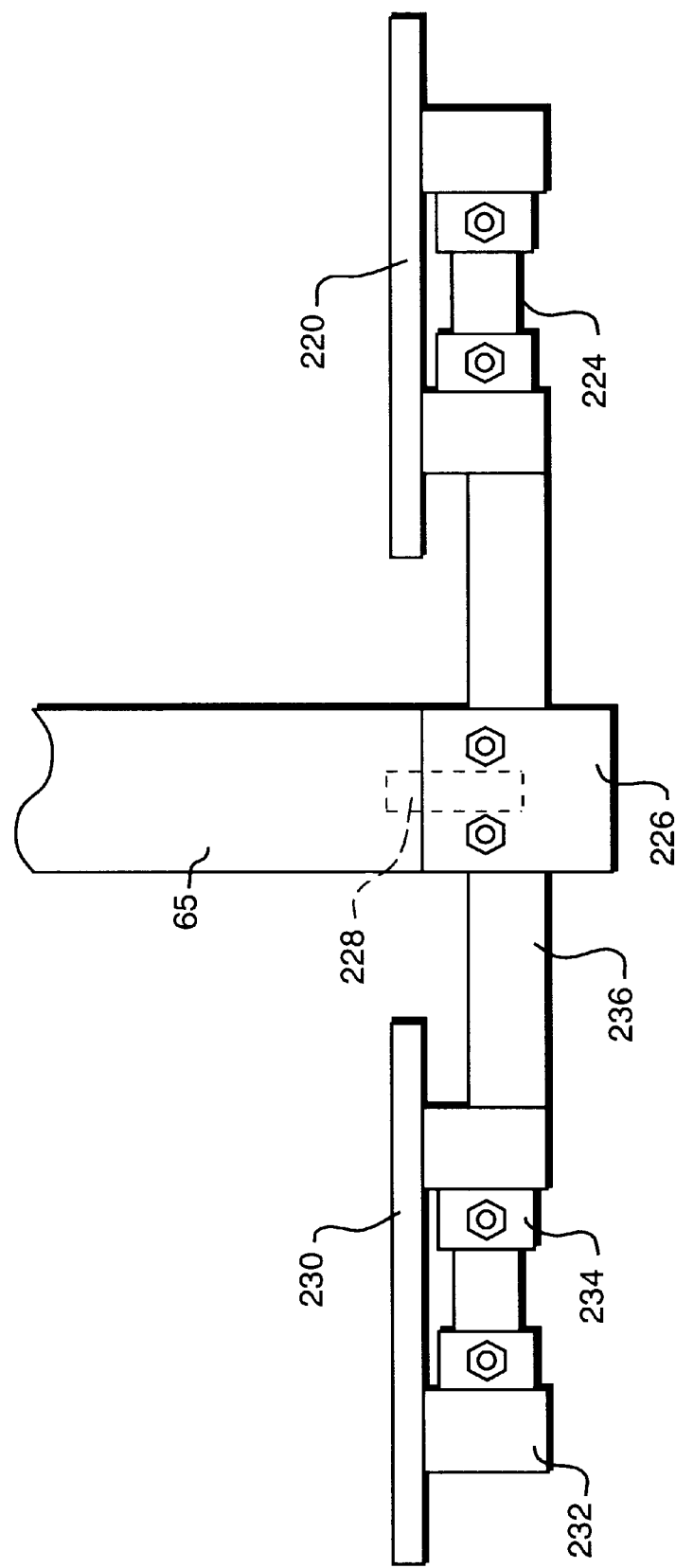
FIG. 12 is a top view of the foot petals of the preferred embodiment of the present invention.

Referring now to FIG. 12, the pedal attachment mechanism of the preferred pedal assembly 208 is shown. As described with reference to FIGS. 11 & 12, pedal assembly includes a pedal support 65 attached at one end to the uprights 210 and at the other to a pair of foot pedals 220. In the preferred embodiment, a support rod 224 is attached to the end of the pedal support 65 via a clamping mechanism 226 and includes an opening for insertion of an anti-rotation pin 228 to prevent rotation of the support rod 224 within the clampign mechanism 226. Support rod 224 extends substantially perpendicularly from pedal support 65 and includes a pair of foot pedals 220 mounted at each end. Foot pedals 220 each include a front surface 230 coated with a non-slip surface and a pair of rear attachment ears 232 extending perpendicularly from the front surface 230 and including a pair of openings dimensioned for passage of support rod 224. A pair of pivotal positioning stops 234 are fixedly mounted to the support rod 224 between each set of attachment ears 232 to prevent axial movement of the foot pedals 220 while allowing foot pedals 220 to rotate about support rod 224. In the preferred embodiment, a plastic sleeve 236 is disposed about support rod 224 between each foot pedal.

Figure 13:
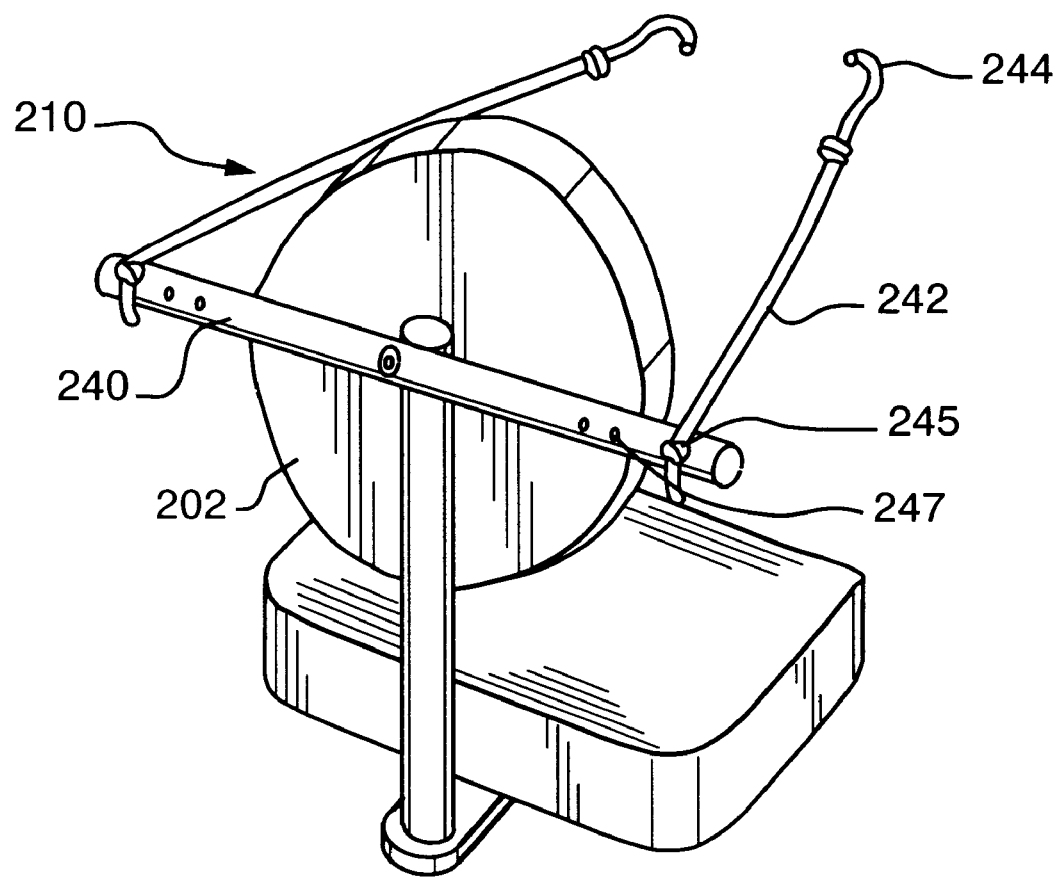
FIG 13 is a rear isometric view of the preferred harness assembly of the present invention.

Referring now to FIGS. 10 & 13, the improved harness system of the preferred embodiment is described. Harness system 210 includes a substantially rigid bar 240 rigidly attached to the back of the chair 202, and a pair of straps 242 attached at one end to the rigid bar 240 on including a pair of hooking members 244 at the other end for attachment to the reel 304 of rod 300. In the preferred embodiment, straps 244 are self-adjusting and locking by sliding through a first hole 245 the back of bar 240 and through a second hole 247 adjacent to the first hole 245 and inside of a loop formed by the strap at the back of the bar 240 to secure the strap in place. In other embodiments, however, conventional buckles or the like are utilized to secure the straps in place. Ropes, or other types of restraints may be substituted for straps 242 to achieve similar results. Rigid bar 240 extends a predetermined distance beyond the outside of the back of chair 202 such that straps 242 do not contact the skin of the user. The preferred harness system 210 has a number of advantages over conventional harnesses. The removal of the harness from the angler's body prevents chafing of the angler's skin and eliminates the risk that the angler will be pulled overboard and dragged under the water by the harness. In addition, the attachment of the harness system 210 to the back of the chair 202 allows increased leverage to be exerted upon the rod 300 through the pivoting of the chair 202 and decreases the amount of arm strain on the angler.

Finally, it should be noted that the component parts of the various embodiments of the invention should be made of materials having sufficient strength and durability to withstand the stresses that will be encountered. Also, the materials must be able to withstand being located in an exposed marine environment. Due to its light weight and structural strength, anodized aluminum is generally preferred unless otherwise noted. The connections between one component to another can be accomplished using techniques well known and suitable for a marine environment such as bolts, machine screws, welding, epoxy, etc. The rotatable connections can be of any rotatable connection technique well known in the art, such as bearings or bushings, provided the rotatable connection selected is suitable for withstanding the rigors of long term salt water exposure.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A fish fighting chair apparatus comprising:
   a deck mounting assembly dimensioned for fixed attachment to a deck of a boat;
   an accessory attachment bar rotatably attached to said deck mounting assembly;
   a chair pivotally attached to one end of said accessory attachment bar; and
   a fish fighting assembly rigidly attached to another end of said accessory attachment bar, said fish fighting assembly comprising a gimbals assembly and pedal assembly comprising a pair of foot pedals;
   wherein a rod may be maintained in said gimbals and an angler may grip the rod and exert a backward force against the rod by pushing against said foot pedals and against said chair, causing said chair to pivot backward and moving the rod through a backward arc.

2. The apparatus of claim 1 wherein said chair further comprises a stanchion for pivoting said chair backward and forward along a plane created by said accessory attachment bar.

3. The apparatus of claim 2 wherein said stanchion has a vertical adjustment.

4. The apparatus of claim 2 wherein said chair further comprises an adjustable seat assembly attached to said stanchion.

5. The apparatus of claim 4 wherein said seat assembly is slidably adjustable relative to the position of said stanchion.

6. The apparatus of claim 5 wherein said seat assembly can be releasably locked.

7. The apparatus of claim 1 wherein a point of attachment of said chair to said accessory attachment bar is offset from a center of rotation of said deck mounting assembly.

8. The apparatus of claim 1 wherein said deck mounting assembly further comprises a swivel tension adjustment assembly.

9. The apparatus of claim 1 further comprising a harness assembly attached to said chair.

10. The apparatus of claim 9 wherein said harness assembly comprises a substantially rigid rod and a pair of straps dimensioned for fixed attachment to said rigid rod and for removable attachment to a reel of the rod.

11. The apparatus of claim 1 wherein said gimbals is dimensioned to remain in a substantially upright position prior to insertion of said rod such that a butt of said rod may be inserted.

12. The apparatus of claim 11 wherein said gimbals comprises an elongated member, a second member disposed parallel to elongated member, and a pin for rotatable attachment between a pair of uprights.

13. The apparatus of claim 1 wherein said fish fighting assembly further comprises a butt-rest assembly for maintaining said rod at a predetermined angle.

14. The apparatus of claim 13 wherein said butt rest comprises a pair of uprights rigidly attached to said accessory attachment bar, each of said uprights comprising a toothed member having a plurality of grooves, and a pin dimensioned for insertion within said grooves to position said rod at said predetermined angle.

15. The apparatus of claim 1 wherein a position of said foot pedals is adjustable.

16. The apparatus of claim 15 further comprising a pedal support rotatably attached to a pair of uprights and a foot pedal adjustment mechanism for adjusting the vertical position of said foot pedals.

17. The apparatus of claim 15 wherein said pedal assembly further comprises a support rod and wherein said foot pedals are rotatable about said support rod.

18. The apparatus of claim 17 further comprising a clamping mechanism for preventing rotation of said support rod and pair of pivotal positioning stops for preventing axial movement of each of foot pedals while allowing each of said foot pedals to rotate freely about said support rod.

* * * * *